United States Patent [19]

Miller et al.

[11] Patent Number: 5,350,983
[45] Date of Patent: Sep. 27, 1994

[54] SUSPENSION DAMPER WITH INTEGRATED CONTROLS

[75] Inventors: John M. Miller, Saline; Venkateswara A. Sankaran, Dearborn, both of Mich.

[73] Assignee: Ford Motor Company, Dearborn, Mich.

[21] Appl. No.: 993,561

[22] Filed: Dec. 21, 1992

[51] Int. Cl.⁵ ............................................ B60G 17/015
[52] U.S. Cl. .................................... 318/254; 280/840; 280/690
[58] Field of Search ..................... 318/254, 138, 439; 188/266; 280/688, 690, 840, 6.1

[56] References Cited

U.S. PATENT DOCUMENTS

| | | | |
|---|---|---|---|
| 3,906,887 | 9/1975 | Kappas | 115/18 E |
| 4,016,442 | 4/1977 | Eggemann et al. | |
| 4,158,799 | 6/1979 | Cappel et al. | 318/626 |
| 4,236,106 | 11/1980 | Davis et al. | 318/599 |
| 4,668,898 | 5/1987 | Harms et al. | 318/254 |
| 4,815,575 | 3/1989 | Murty | |
| 4,892,328 | 1/1990 | Kurtzman et al. | |
| 4,896,062 | 1/1990 | Pollard | |
| 4,969,662 | 11/1990 | Stuart | |
| 5,006,744 | 4/1991 | Archer et al. | 310/89 |
| 5,027,048 | 6/1991 | Masrur et al. | |
| 5,028,073 | 7/1991 | Harms et al. | |
| 5,060,959 | 10/1991 | Davis et al. | 280/6.1 |
| 5,070,284 | 12/1991 | Patil et al. | 318/558 |
| 5,091,679 | 2/1992 | Murty et al. | 318/153 |

Primary Examiner—Bentsu Ro
Attorney, Agent, or Firm—Raymond L. Coppielle; Roger L. May

[57] ABSTRACT

An electrically powered active suspension system is disclosed having a suspension unit wherein the system controller and the power electronics module are integrated into a single housing with the motor mechanism of the suspension unit.

9 Claims, 6 Drawing Sheets

SUSPENSION DAMPER WITH INTEGRATED CONTROLS

BACKGROUND OF THE INVENTION

1. Field of the Invention

The present invention relates generally to an active suspension system for a vehicle having a plurality suspension units for maintaining a constant vehicle ride height. More particularly, the present invention relates to an active suspension system wherein the system controllers are integrated into the housing of the suspension unit.

2. Disclosure Information

Various types of active suspension systems have been proposed which are capable of responding to road inputs in real time with power inputs having sufficient robustness to control body motion of an automotive vehicle. As used herein, the term "active suspension" means a suspension which has a frequency response and power output characteristics sufficient to respond in real time to control force inputs to the vehicle chassis arising from such sources as road imperfections, crosswinds, and vehicle turning maneuvers. As used herein, the terms "body" and "chassis" mean either a conventional unitized automotive body or conventional frame and body automobile or any combination thereof. Active suspensions can be hydraulic systems wherein a hydraulic actuator in conjunction with complex valve componentry is used to maintain the ride and handling characteristics of the vehicle as well as the vehicle height at its optimum considerations. Other types of active suspension systems are electrically powered systems such those disclosed in U.S. Pat. Nos. 5,027,048; 5,060,959 both assigned to the assignee of the present invention, as well as U.S. Pat. Nos. 5,028,073; 4,969,662; and 4,892,328.

In the electrically powered systems described above, each includes a plurality of suspension units which are electrically connected to at least a system controller and typically to a power electronics module as shown in FIG. 1. The above systems disclose that the system controller, the power electronic module and other system modules operatively associated with the suspension units are located a discrete and remote distance away from the suspension unit itself. When the system controllers are located remote from the actuator motors themselves, disadvantages in the system can arise. For example, when the motor power drivers are located remote from the motor and when the motor power conditioning functions as either a brushless DC or as an AC drive, then the voltage present on the motor.leads will radiate considerable electro-magnetic interference (EMI). Prior attempts to alleviate the EMI include twisting the motor leads or providing a cable shield back to a suitable ground and/or slowing down the electrical transition starting switching. However, these methods and other methods to detune the switching events are at the expense of considerable loss in efficiency. Furthermore, locating the control modules distant from the individual suspension actuators can also lead to ripple currents outside of the actuator, increased noise pick-up as well as temperature induced disadvantage affects.

Therefore, it would be advantageous to provide a system wherein the system control modules are located as near as possible to the actuator itself. However, the functional integration of the system controllers and the motor power drivers for the suspension actuators has not been feasible to date for reasons of the thermal environments involved, the physical sizes of the components, especially passive devices, as well as the electrical environment of the system. The present invention overcomes these problems and provides a suspension unit for an electrically powered suspension system wherein the system controllers and the motor powered drivers are integrated directly into the suspension unit.

SUMMARY OF THE INVENTION

The present invention provides an electrically controlled machine apparatus comprising a housing having a predetermined volume and an electric motor means disposed in the housing. The apparatus of the present invention further includes control means electrically connected to the motor means for dynamically developing current commands for the motor means in response to operating parameters of the motor means, the control means being disposed adjacent to the motor means in the housing. The apparatus further includes power module means electrically connected to the motor means and the control means for synthesizing an input current to the motor means in response to the current commands, the power module means being disposed in the housing adjacent the motor means. The electrically controlled machine apparatus of the present invention also includes cooling means for regulating the temperature in the housing.

The present invention also discloses a suspension unit of an electrically power active suspension system wherein the suspension unit includes a housing having a predetermined volume, an electric motor disposed in the housing, and control means electrically connected to the motor for dynamically developing current commands through the motor in response to operating parameters of the motor. The control means is disposed adjacent the motor means in the housing. The suspension unit further includes power module means electrically connected to the motor and the control means for synthesizing an input current to the motor means in response to the current commands, the power module means being disposed in the housing adjacent to the motor means. The present invention provides that the predetermined volume of the housing be less than 100 cubic inches and preferably between 40 to 50 cubic inches.

DETAILED DESCRIPTION OF THE PREFERRED EMBODIMENTS

Figure 1:
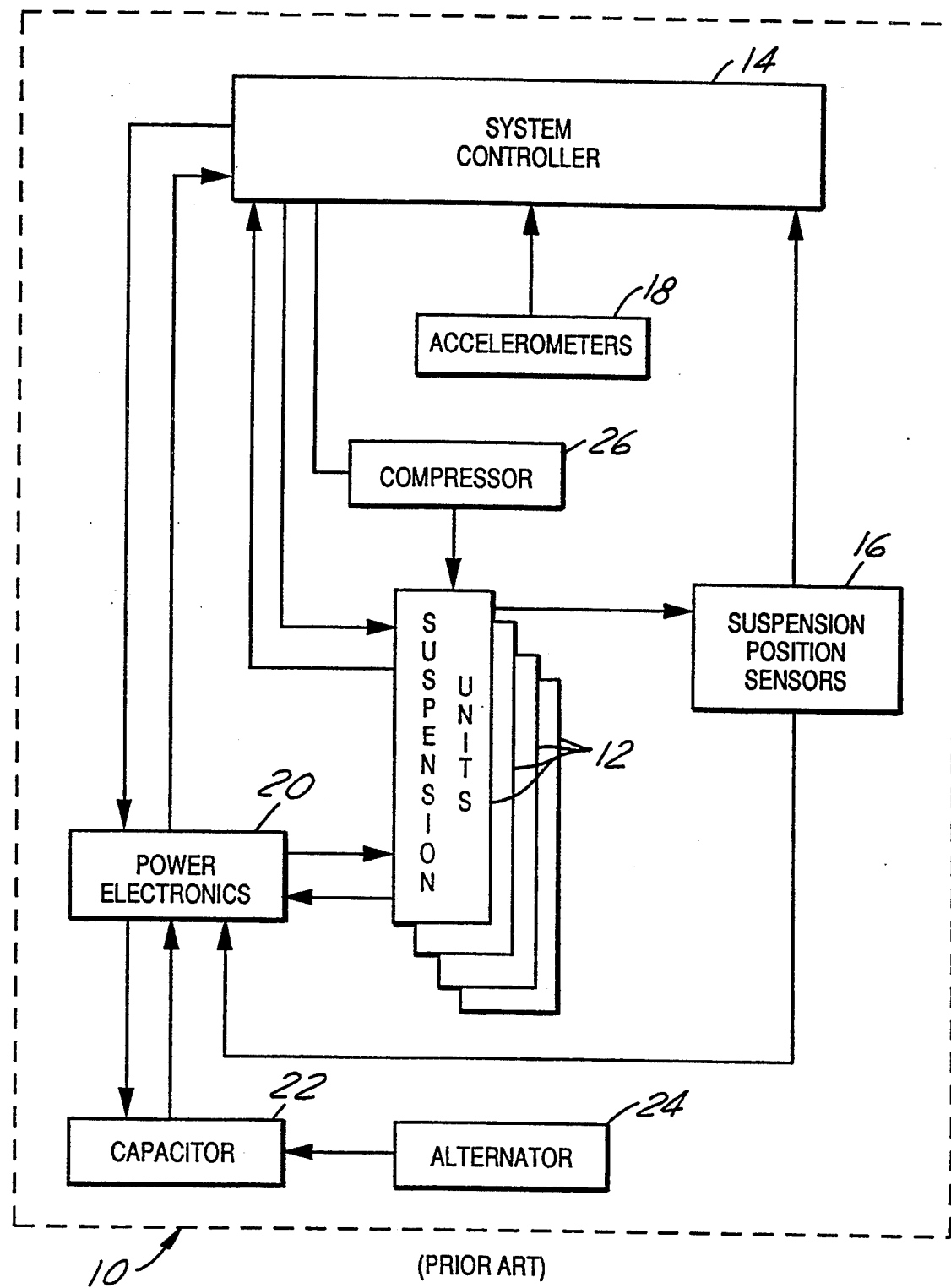
FIG. 1 is a schematic block diagram of a prior art electrically powered active suspension system.

Referring now to the drawings, FIG. 1 shows a schematic block diagram of an electrically powered active suspension system 10 known in the prior art as taught by U.S. Pat. Nos. 5,027,048 and 5,060,959, assigned to the assignee of the present invention. The suspension system 10 includes a plurality of suspension units 12 electrically connected to a system controller 14. System controller 14 communicates with and is operatively connected with several other components of the suspension system such as suspension position sensor 16, accelerometers 18 as well as power electronics module 20. In the prior art system of FIG. 1, the suspension components, including the system controller 14, the position sensor 16, the accelerometers 18, and the power electronics module 20 are located at distinct and predetermined distances from the suspension units 12. Furthermore, the system controller 14 and the power electronics module 20 are housed in separate control module housings. In this type of arrangement, due to the distances between the suspension units and the system controller power electronics module, electromagnetic interference (EMI) often creates a disadvantage in the operation of the overall system. Furthermore, by packaging the system controller 14 and power electronics module 20 in separate module housings, valuable underhood compartment space is used. For example, the combined volumes of the module housings of system controller 14 and power electronics module 20 may exceed 2000 in$^3$.

System controller 14 comprises a microprocessor controller and appropriate input and output devices including analog to digital and digital to analog converters. The microprocessor preferably comprises a read only memory (ROM) for storing various constants and control programs for controlling the suspension system 10. The microprocessor further includes a central processing unit (CPU) for reading out control programs from the ROM to execute required operations, as well as a random access memory (RAM), which temporarily stores various data related to the operations to be executed within the CPU, and which allows the CPU to read out the data stored therein. Further details of the system controller 14 are explained in U.S. Pat. No. 5,027,048, at columns 8 and 9, the details of which are herein incorporated by reference.

In operation, system controller 14 measures the force encountered by the vehicle road wheel and tire assembly and generates a command to the power electronics module 20 to actuate the suspension units 12 to counteract the force build-up produced due to the encounter. Power is then supplied to the suspension units by means of capacitor 22 operatively connected to the power electronics module 20 and which in turn is supplied with power by means of an alternator 24 driven by the engine of the vehicle. The suspension system 10 may further include a compressor 26 which supplies air to an associated air spring assembly formed integral with the suspension unit 12 as taught in the '048 and '959 patents or which may be supplied in parallel with suspension units 12. The air suspension system supplied by compressor 26 generally supports the static weight of the vehicle to reduce the motor draw upon the electrically powered suspension system 10. Those skilled in the art will appreciate in view of this disclosure that the air compressor 26 and air spring associated therewith are merely intended to be exemplary of a class of devices comprising fluid power units. Other types of such units could be used in the system according to the present invention include but are not limited to hydropneumatic, or even low powered hydraulic devices.

Figure 2:
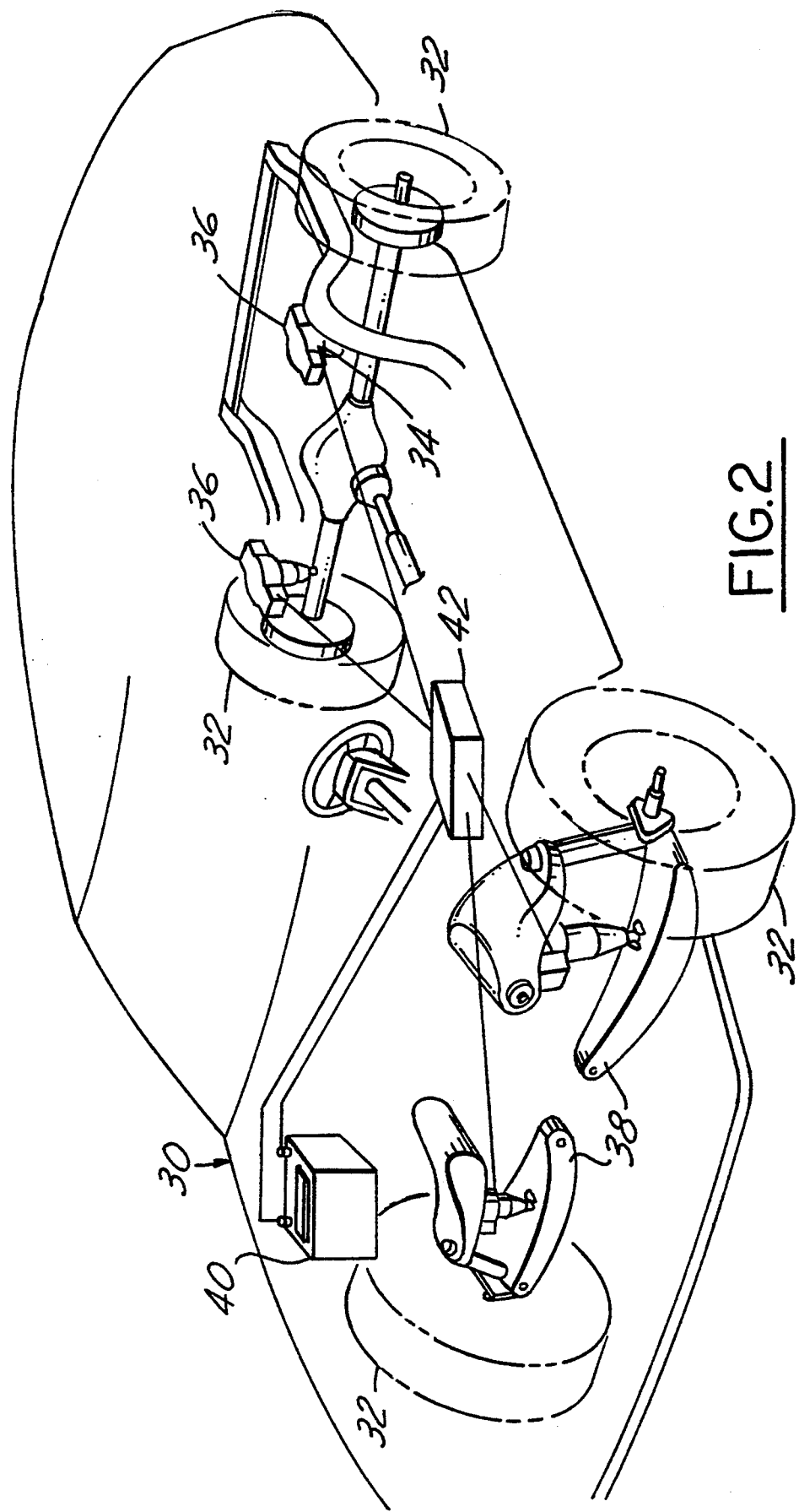
FIG. 2 is a perspective view of a vehicle having an electrically powered active suspension system according to the present invention.

Referring now to FIG. 2, a vehicle 30 having an electrically powered active suspension according to the present invention includes a plurality of road wheel and tire assemblies 32 rotatably attached at spindles 33. The vertical displacement of the road wheel and tire assemblies relative to the chassis of vehicle 30 is controlled by means of suspension units 34 generally mounted resiliently between chassis 36 and a lower control arm 38. Each of the suspension units 34 is electrically connected to a power source, such as a vehicle battery 40 as well as to a central controller 42, the details of which will be explained in greater detail below. It should appreciated by those skilled in the art that a system according to the present invention could be employed not only with the suspension geometry illustrated herein, but also with other types of suspensions either known in the art of suggested by this disclosure.

Figure 3:
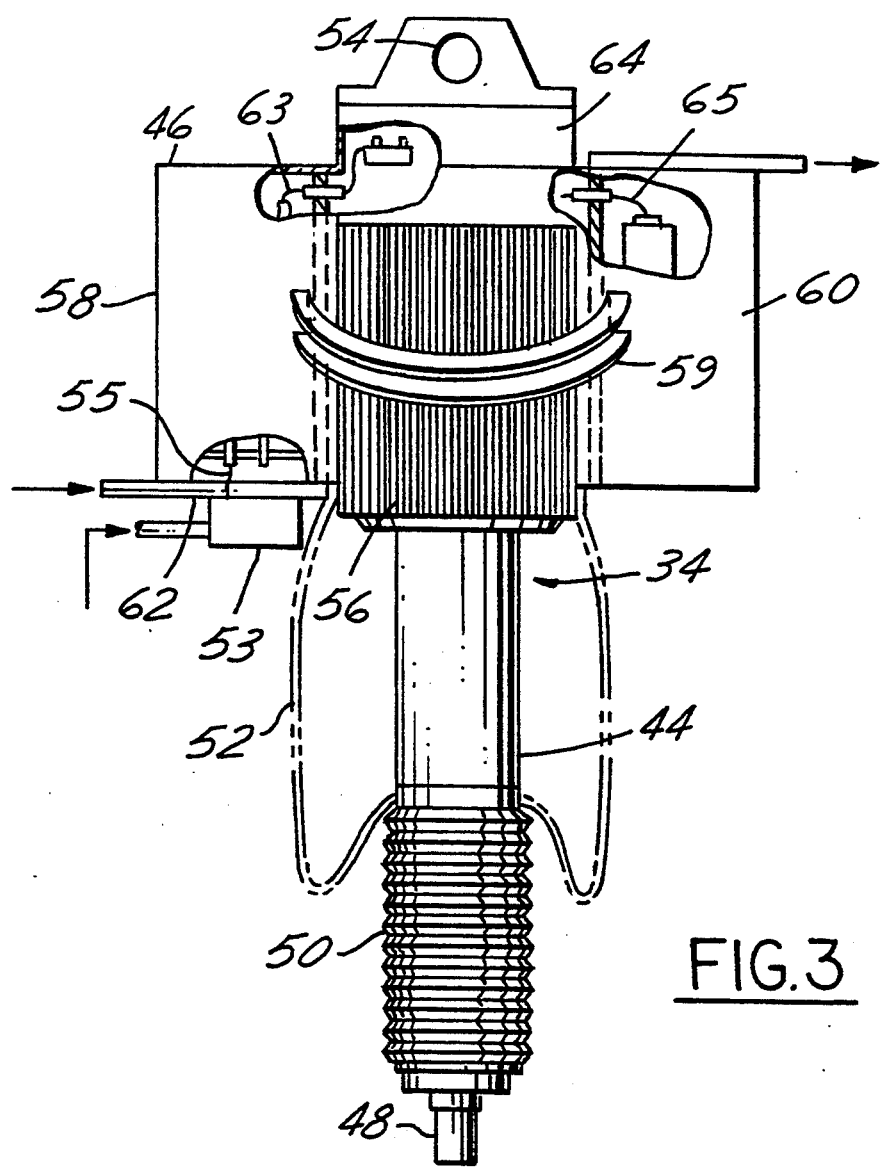
FIG. 3 is a schematic representation of an electrically powered active suspension unit structured in accord with the principles of the present invention.
Figure 4:
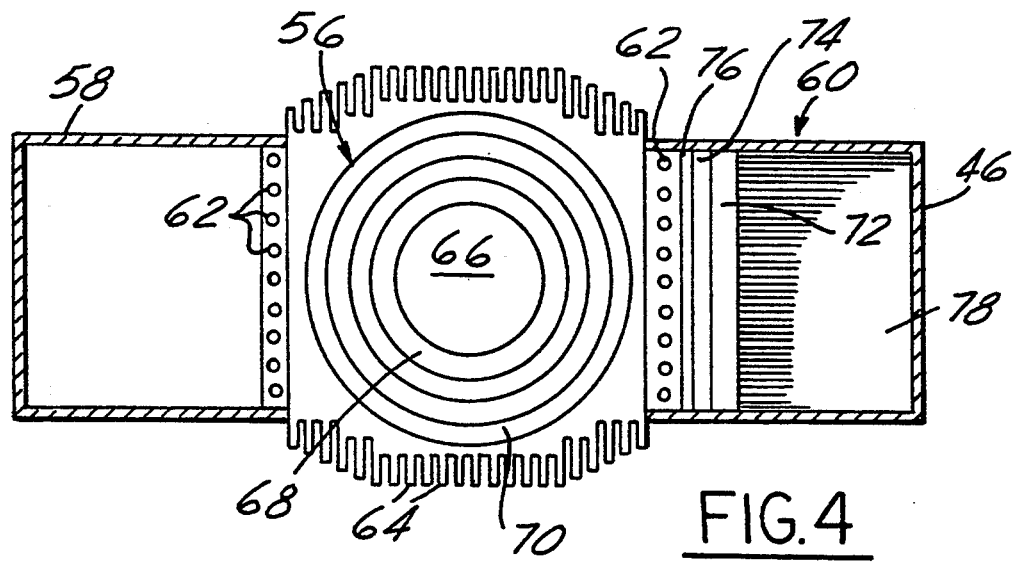
FIG. 4. is a top plan view of FIG. 3.

One type of electrically powered suspension unit structured in accord with the principles of the present invention is shown in FIGS. 3 and 4. The suspension unit 34 comprises an electric motor driven, threaded rod and ball screw assembly such as disclosed in U.S. Pat. Nos. 5,027,048 and 5,060,959 at columns 6–8 and as shown generally in FIGS. 2 and 4 of those patents, the disclosure of which is hereby incorporated by reference. The suspension unit 34 includes a lower housing 44 and an upper housing 46. The lower housing 44 includes a mounting hole 48 for attachment of the unit to the lower control arm 38 of the vehicle as well as bellows 50 for accommodating the jounce and rebound-excursions of the suspension unit. An optional rolling lobe air spring 52 may be secured directly to the suspension unit 34 or may be supplied in parallel with the unit 34. A solenoid 53 receives signals from the system controls 58 through solenoid control witess55 to add or vent pressurized air to the rolling lobe air spring 52 from a remote compressor. As explained above, the primary purpose of the air spring and its associated compressor and air suspension system is to support the static weight of the vehicle to reduce the overall power draw on the electrically powered suspension unit 34. The solenoid 53 not only provides pressurized air to the air spring 52, but may also provide pressurized air to other portions of the upper housing 46 of the suspension unit such as, for example, the motor and controller compartments. This provides an advantage in that the motor compartment, surrounded with pressurized air at approximately 200 psi, operates in a clean, dry environment.

The upper housing 46 includes a mounting eye assembly 54 for attaching the suspension unit 34 to the vehicle chassis 36 and includes a predetermined volume enclosing an electric motor 56, the system controls 58 and the power electronics module 60, the details of which will be described in greater detail below. The upper housing 46 may further include a current sensor and encoder module as well as cooling means such as shown by fluid conduits 62. The cooling conduits 62 regulate the temperature within the housing 46. The upper housing may also include a communications channel 59 for housing the electrical wiring or other communication lines between the various components and motor in the housing. Alternatively, this channel 59 could be disposed interior of the motor housing.

Referring now to FIG. 4, there is shown a top plan view of the suspension actuator 34 of the present invention. As shown in FIG. 4, the upper housing 46 encases the electric motor 56, the system controller 58, and the power electronics module 60. Upper housing 46 further includes a plurality of cooling fins 64 surrounding the motor 56 to provide for heat dissipation of the motor. As such, cooling fins 64 in conjunction with the fluid conduit 62 comprise cooling means for regulating the temperature of the housing 46 and the internal components thereof.

As is fully described in U.S. Pat. No. 5,027,048, motor 56 includes a rotor 68 and stator 70 circumferentially disposed around a shaft 66. The shaft 66 is connected to a ball screw assembly which, upon rotation of shaft 66, causes extensionary travel of the suspension unit 34. As previously noted the present invention may be practiced with permanent magnet, induction, variable reluctance or inductance motors, or yet other types of motors suggested by this disclosure. Furthermore, the present invention is not meant to be limited solely to a suspension unit 34 having an electric motor, but may also be practiced with a suspension unit having an electromagnetic device which creates a force on a magnetically conductive member in response to current generated by signal controller such as is shown in U.S. Pat. No. 4,892,328.

As further shown in FIG. 4, the power electronics module 60 includes an area 72 for a gate drive circuit, an area 74 for the power devices and an isolation area 76 disposed adjacent the motor on a side of the motor diametrically opposed from the system controls 58. The power electronics module 60 synthesizes an input current sent to the motor 56 in response to current commands generated by the system controller 58 to respond in real time to force inputs acting upon the suspension unit 34. The system controller 58 is electrically connected to the motor by wires 63 and to the power module 60 by wires 65 (or alternatively through channel 59) and dynamically develops current commands for the motor in response to the operating parameters of the motor as will be explained below. The system controller 58 is disposed adjacent the motor in the housing as shown in FIG. 4.

The housing 46 may further include an area for receiving capacitor banks 78 therein. The capacitor bank area 78 may include an MLC capacitor in addition to an electrolytic capacitor which functions to supply power to the suspension unit 34 and motor 56. Although the capacitor 78 has been shown as comprising a single unit, for certain applications of the system according to the present invention it may be .desirable to use a plurality of high volumetric efficiency capacitors such as an electrochemical double layer capacitor (EDLC), with the capacitors being stackable one to another so that in the event of a failure of one capacitor, it can be easily removed from the housing 46 and replaced without the need to replace the entire.suspension actuators 34.

Figure 5:
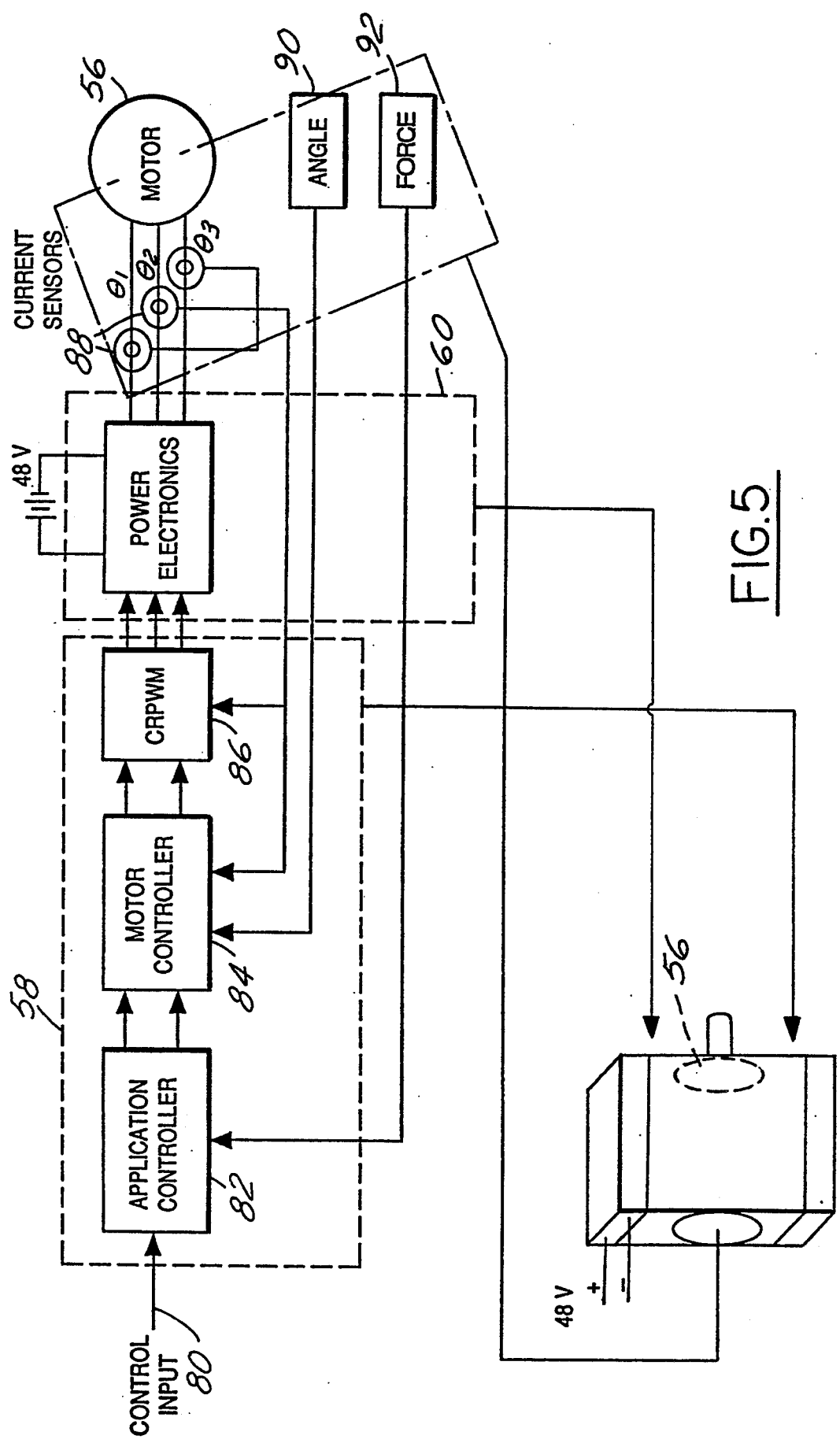
FIG. 5 is a system block diagram of the suspension unit of FIG. 3.

FIG. 5 shows a functional schematic block diagram of an integrated suspension actuator according to the present invention. As shown in FIG. 5, the integrated suspension actuator includes a motor 56, a system controller 58 and a power electronics module 60 electrically connected to a power source shown as a 48-volt power source. The system controller 58 includes an application controller 82, a motor controller 84 and a current regulator 86 such as a current regulated pulse width modulator (CRPWM). In operation, an input control signal 80 generated by the central controller 42 is sent to the system controller 58 of the suspension actuator 34. There the control signal 80 is directed to a application controller 82 which functions to signal the system controller what total body functions the vehicle is performing. For example, the application controller 82 receives a signal indicating that the vehicle is experiencing dive due to braking of the vehicle. From the application controller 82 the signal is sent to a motor controller 84, such as a digital signal processor. The motor controller determines or calculates the current commands needed to be sent to the motor to,respond to the force acting upon the actuator 34. The signal is then conditioned by CRPWM at 86 and sent to the power electronics module 60 which synthesizes and generates a desired command to the motor.

As shown in FIG. 5, the motor controller 84 further receives information from a plurality of current sensors 88 and a motor angle sensor 90. The current sensors 88 are integrated analog type sensors with isolated signal conditioning capable of producing an analog signal. Other types of known current sensors may also be utilized which generate a digital signal. In such case, a digital to analog and analog to digital converter will be acquired for the system. By measuring the exact current produced in each of the three phases of the motor, it is possible to determine what force the motor is producing at any given instant without the need for a dedicated force sensor such as a load cell. This is essential in determining what amount of force is necessary to respond to the inputs on the actuator to maintain the vehicle ride and handling characteristics at their optimal. The motor angle sensor 90 may comprise an optical encoder for determining the precise rotary location of the armature of the motor 56. By knowing the precise rotary location of the armature, the position of the sprung and unsprung mass of the vehicle relative to one another can be calculated by the motor controller. In this regard, the use of an external height sensor is unnecessary. Those skilled in the art will appreciate that other types of encoders or positioners may be employed for the purpose of providing position information needed for electronic commutation purposes. The system may also include a force sensor 92 which communicates.with motor 56 and application controller 82 for the purposes of closed loop control, but as explained above, may be eliminated by directly measuring the exact current produced in each phase of the motor. The electrical schematic details of the system controller 58 are shown in further detail and are extensively described in U.S. Pat. No. 5,027,048 at FIG. 6, the disclosure of which is incorporated by reference.

Figure 6A:
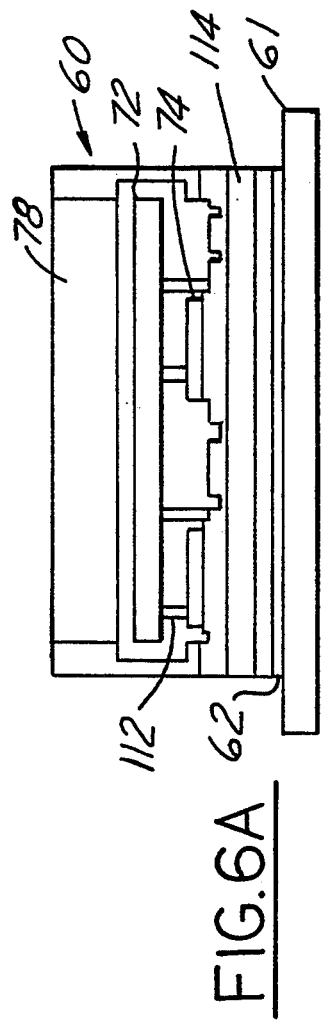
FIGS. 6A–6B are cross sectional and plan views of a power electronics of the module used with the present invention.
Figure 6B:
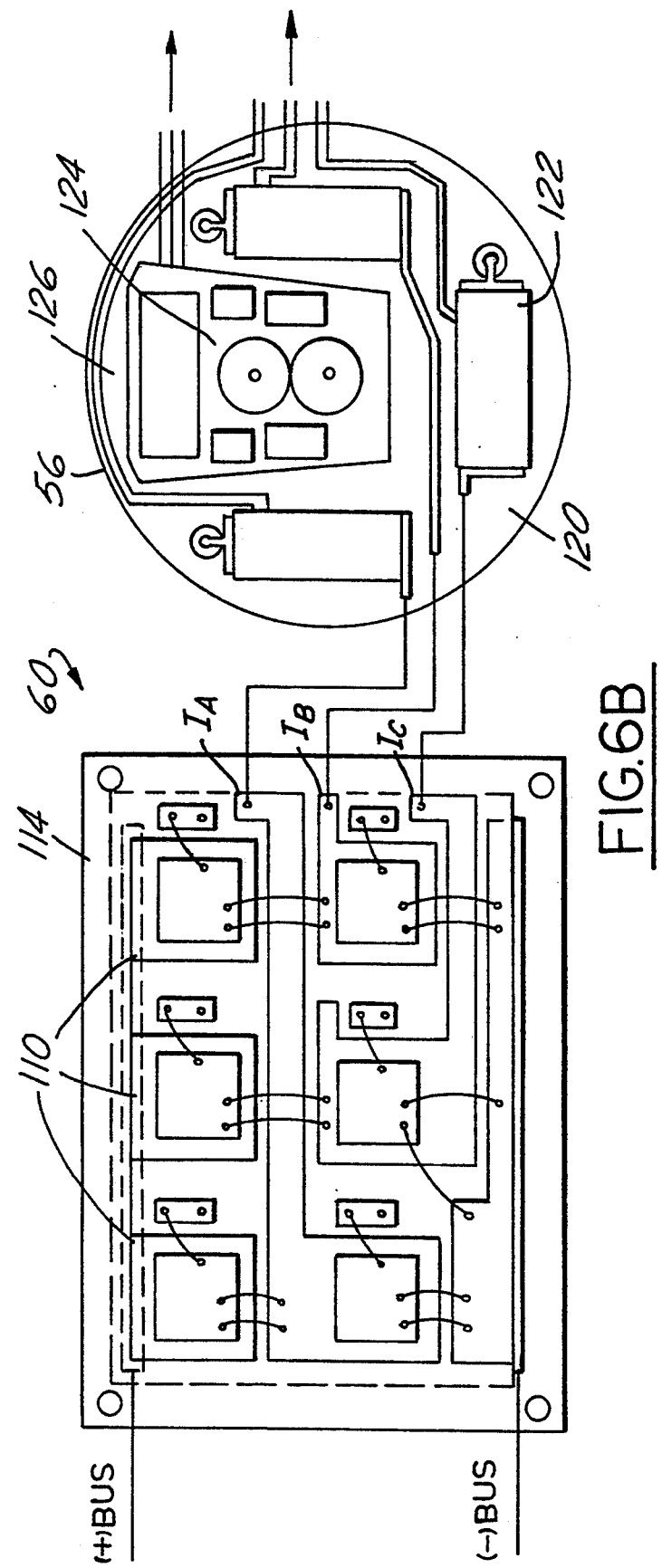
Figure 7A:
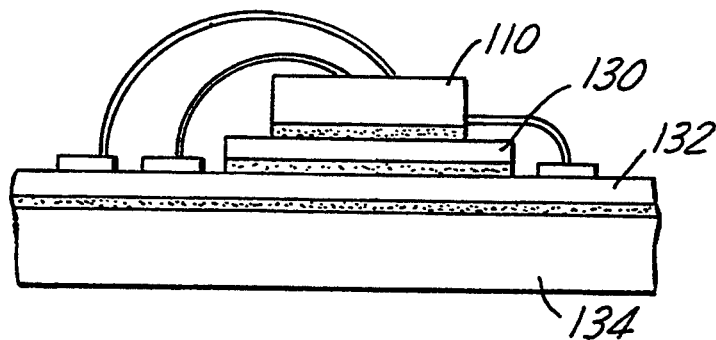
FIGS. 7A–C are cross-sectional views of alternative transistor stack geometries suitable for use in the present invention.
Figure 7B:
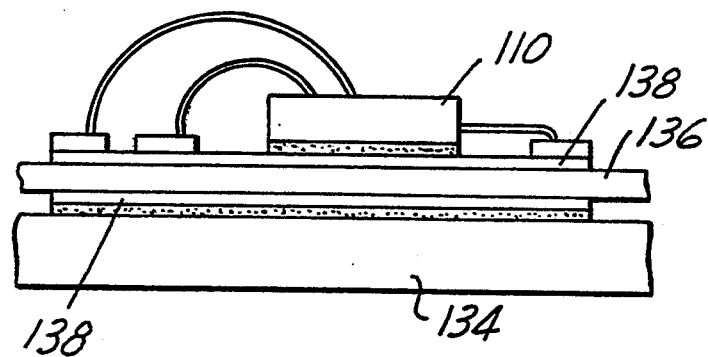
Figure 7C:
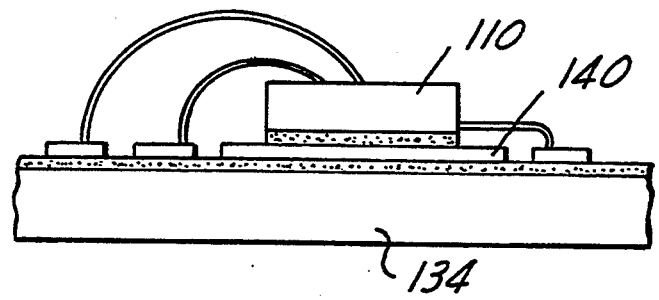

Referring now to FIG. 6A and 6B, a cross-sectional view of the power electronics module 60 is illustrated. The. power module 60 includes a base plate 61 supporting the capacitor.bank 78, the gate driver and protection circuit 72, and the power devices 74. The capacitor devices, such as a 100 V MLC or PML capacitor is interposed between the +bus and the −bus of the power module 60. Adjacent the capacitor bank 78 is the gate drive and protection circuit 72. The gate driver section of the module consists of gate drives for all the power devices in the module. The gate drive circuits can be built using high voltage integrated circuits or optically isolated circuits. The protection circuit protects against short circuits, over currents and voltage surges as well as over temperature protection. These are accomplished by using protection circuits commonly known and available to those skilled in the art. The gate drive and protection circuit 72 is mechanically attached to the power devices through the use of pins 112 which project into the substrate board of the power devices 74. The power devices 74 can be transistors such IGBTs or MOSFETs. The transistors 74 are secured to a substrate which electrically isolates the power device from the base plate. Various types of substrates can be used with the present invention, the selection depending upon the thermal dissipation requirements of the power electronics module. Examples of such types of substrates are shown in FIGS. 7A-C in which will described in greater detail below. Interposed between the substrate and the base plate 61 is an area through which the cooling conduit 62 can be placed.

FIG. 6B shows a top view of the power electronics module 60 of the present invention utilizing MOSFETs in place of IGBTs. The MOSFETs 110 are connected to the substrate 114. The power electronics module is connected to the motor. through the current wires $I_A$, $I_B$, $I_C$. The MOSFETs are disposed between the positive bus and negative bus on the substrate board. As can be seen in 6B, the phase current wires $I_A$, $I_B$ and $I_C$ are directly attached to an integrated encoder and current sensor module 120 which can be directly attached to the topmost portion of motor 56. The current sensor module 120 includes a digital AC current sensor 122 for each phase lead into the motor as well as a digital encoder 124. The encoder, 124 generates a digital signal to the system controller 58 as an indication of the rotary position of the armature of the motor 56 so that a calculation of position of the actuator can be determined. An encoder shield 126 surrounds the digital encoder to protect the encoder from contamination.

The circuit board substrate for the power electronics module 60 as shown in FIG. 6B can be fabricated from any of a number of transistor stack geometries such as is shown at FIGS. 7A-C. As shown in FIG. 7A, the transistor stack and circuit geometry includes a transistor or MOSFET 110 soldered to a heat spreading layer 130 for dissipating heat and which can be fabricated from copper, or copper-invar-copper or copper-poly-copper or other materials having a thermal expansion coefficient close to that of the silicon transistor 110. The heat spreading layer 130 is soldered to a metalized ceramic substrate 132 fabricated from alumina, aluminum nitride or silicon carbide. This thick film hybrid transistor stack has a total of three soldered joints therein.

FIG. 7B shows a cross-sectional view of a direct bond copper or metalized ceramic stack design wherein the direct bond copper material is a sandwich consisting of a twenty-five mil ceramic layer 136 between two twelve mil copper layers 138. The bond between the layers is a chemical bond. This ceramic layer 138 can be fabricated from alumina, aluminum nitride, beryllium oxide or silicon carbide, The thermal expansion coefficient of the direct bond copper geometry is dictated by the ceramic layer 136 which is close to that of the silicon 110. Since the copper layer is thick, there is no need for a heat spreading layer as with the three soldered layer design of FIG. 7A and therefore the number of solder joints in this geometry is two.

A third transistor stack geometry is shown in FIG. 7C. This geometry is known as a plasma spray substrate wherein the ceramic layer 140 is directly plasma sprayed onto the heat sink 134 and the copper pattern is sprayed over the ceramic layer 140. The silicon device 110 is then soldered or epoxied-glued to the copper pattern. In this structure there is only one solder joint thus allowing for an even greater heat dissipation. The present invention proposes to utilize the plasma spray substrate for the power electronics module 60 as shown in FIG. 6B. An additional type of geometry, an insulated metal substrate can be employed which uses polymers such as polyimide for isolation purposes and the transistor stack is similar to that disclosed in FIG. 7A, the thick film hybrid structure having three soldered joints.

In the suspension actuator 34 of the present invention wherein the system controller 58, electric motor 56, the power electronics module 60 and the capacitor bank 78 are integrated directly into a single housing, communication between the various components is achieved through a minimal number of electrical contacts and leads, specifically by a minimum of three wires. By minimizing the length of the communication wires between the various components, the present invention greatly reduces the effects of electro-magnetic interference on other electrical systems within the vehicle. By packaging the motor power electronic drivers into the actuator, the EMI generated is greatly reduced and only a very short phase link between the power stage transistors and the motor winding is necessary. Furthermore, the integrated power package further limits the conduction of ripple currents outside of the actuator. Proper selection of the DC bus capacitors act as a natural filter and minimizes the amount of conducted EMI on the DC supply link.

Furthermore, the sensor leads of the integrated actuator are oriented normal to ,the motor phase leads thus minimizing noise pickup. The further advantage of the present invention is to regulate the temperature of all of the component control modules to maintain a relatively consistent temperature with one another to reduce the amount of power drain, on each of the components. It is well known that as temperature rises within an integrated circuit, the resistance of the circuit also increases. By supplying a cooling mechanism, such as fluid conduit 62 or through the use of air cooling by use of cooling fins surrounding the motor, the integrated actuator assembly. 34 of the present invention overcomes the problem.

By integrating the system controller and the power electronics module with the motor into the housing 46 of the actuator, the housing volume can be maintained between 35-55 cubic inches. In. the preferred embodiment, the upper housing has a dimension of approximately 6 inches by 3.2 inches by 2.2 inches or a total volume of approximately 40 cubic inches. This prevents a space savings over the prior art suspension systems as described above wherein the total volumes of the separate control module housings resulted in a combined volume over 2000 in$^3$.

The present invention further presents an advantage of reducing the number of electrical leads needed between control module.housings. In doing such, the potential for short circuits due to moisture or other harmful environmental factors is greatly reduced since the environmental hazard cannot penetrate into as many electrical lead stations.

The present invention is not meant to be limited solely to use of an electric actuator for an electrically powered active suspension. The principles and concepts of the present invention whereby the system controllers and the power electronics module or power drivers are incorporated into the housing of the motor unit itself can be applied to other electrically powered systems as well. For example, the present invention may be applied to an electric motor of an electrically powered vehicle as well as to an electrically powered air conditioning system.

Various modifications will no doubt occur to those skilled in the art to which this invention pertains. For example, certain functions of the microprocessor is described herein and could be performed by conventional switching circuits or other conventional control devices. Further the choice of a particular suspension in which to employ a system according to the present invention is left to the individual designer. All such modifications and variations which basically rely upon the teaching with which this disclosure has advanced the art are properly considered to be within the scope of this invention as defined by the appended claims.

What is claimed is:

1. An electrically powered suspension unit for an automotive vehicle, comprising:
    a housing having a predetermined volume;
    electric motor means disposed in said housing;
    control means electrically connected to said motor means for dynamically developing current commands for said motor means in response to operating parameters of said motor means, said control means disposed adjacent said motor means in said housing;
    power module means electrically connected to said motor means and said control means for synthesizing an input current to said motor means in response to said current commands, said power module means disposed in said housing adjacent said motor means; and
    cooling means for regulating the temperature in said housing, whereby said motor means, said control means and said power module means are integrated into said housing.

2. An electrically powered suspension unit according to claim 1, further including capacitor means disposed in said housing adjacent said power module means.

3. An electrically powered suspension unit according to claim 1, wherein said motor means comprises a brushless, multi-phase electric motor.

4. An electrically powered suspension unit according to claim 1, wherein said control means includes feedback signal receiving means for receiving feedback signals from said electric motor, said feedback signals comprising a motor current signal, a motor temperature signal, and a motor position signal and developing said current commands in response to said signals.

5. An electrically powered suspension unit according to claim 4, wherein said feedback signal receiving means comprises a digital signal processor.

6. An electrically powered suspension unit according to claim 5, wherein said feedback signal receiving means includes a digital AC current sensor and an optical encoder disposed in said housing directly adjacent said motor means.

7. An electrically powered suspension system disposed between the sprung and unsprung masses of an automotive vehicle, comprising:
    a plurality of electrically powered suspension units, each suspension unit disposed between the sprung and unsprung vehicle masses, each suspension unit including:
    a housing having a predetermined volume of between 35-55 in$^3$;
    a three phase rotary electric motor disposed in said housing;
    control means electrically connected to said motor for dynamically developing current commands for said motor in response to operating parameters of said motor, said control means disposed in said housing adjacent said motor;
    power module means electrically connected to said motor and said control means for synthesizing an input current to said motor in response to said current commands, said power module means disposed in said housing adjacent said motor diametrically opposite said control means; and
    cooling means for regulating the temperature in said housing, whereby said motor, said control means and said power module means are integrated into said housing.

8. An electrically powered suspension system according to claim 7, wherein said cooling means includes a plurality of fluid conduits, each of said fluid conduits communication with said control means and said power module means to dissipate heat generated therein.

9. An electrically powered suspension system according to claim 7, wherein said cooling means includes a plurality of fins formed in said housing, said fins being operative to dissipate heat generated in said housing through communication with ambient air.

* * * * *